(12) United States Patent
Chen (10) Patent No.: US 8,144,219 B2
(45) Date of Patent: Mar. 27, 2012

(54) PIXEL PROCESSING METHOD AND IMAGE PROCESSING SYSTEM THEREOF

(75) Inventor: Yung-Wei Chen, Taipei (TW)

(73) Assignees: Silicon Motion Inc., keji Chuangyeyuan, Tianan Digital, Futian, Shenzhen, Guangdong; Silicon Motion Inc., Jhubei, Hsinchu County (TW)

( * ) Notice: Subject to any disclaimer, the term of this patent is extended or adjusted under 35 U.S.C. 154(b) by 473 days.

(21) Appl. No.: 12/534,147

(22) Filed: Aug. 2, 2009

(65) Prior Publication Data

US 2010/0157111 A1     Jun. 24, 2010

(30) Foreign Application Priority Data

Dec. 23, 2008  (TW) .............................. 97150295 A (51) Int. Cl.
 *H04N 5/217* (2011.01)
 *H04N 9/64* (2006.01)

(52) U.S. Cl. ........................................ 348/241; 348/242
(58) Field of Classification Search .................. 348/241, 348/242
See application file for complete search history.

(56) References Cited

U.S. PATENT DOCUMENTS

| | | | |
|---|---|---|---|
| 2007/0002154 A1* | 1/2007 | Kang et al. | 348/272 |
| 2007/0110300 A1* | 5/2007 | Chang et al. | 382/162 |
| 2008/0043115 A1* | 2/2008 | Tsukioka | 348/222.1 |
| 2010/0061625 A1* | 3/2010 | Lukac | 382/162 |
| 2010/0086202 A1* | 4/2010 | Omata et al. | 382/162 |

* cited by examiner

*Primary Examiner* — James Hannett
(74) *Attorney, Agent, or Firm* — Winston Hsu; Scott Margo (57) ABSTRACT

A pixel processing method includes: determining a first difference magnitude according to a difference between a predetermined color component value of a target pixel and a predetermined color component of a surrounding pixel positioned on a first direction, determining a second difference magnitude according to a difference between the predetermined color component value of the target pixel and a predetermined color component of a surrounding pixel positioned on a second direction, generating a first determining value according to the predetermined color component values of a plurality of pixels positioned on the first direction and the first difference magnitude, generating a second determining value according to the predetermined color component values of a plurality of pixels positioned on the second direction and the second difference magnitude, and selecting a plurality of specific pixels to compute for a target color component value according to the first and second determining values.

21 Claims, 6 Drawing Sheets

| $R_{11}$ | $G_{12}$ | $R_{13}$ | $G_{14}$ | $R_{15}$ |
|---|---|---|---|---|
| $G_{21}$ | $B_{22}$ | $G_{23}$ | $B_{24}$ | $G_{25}$ |
| $R_{31}$ | $G_{32}$ | $R_{33}$ | $G_{34}$ | $R_{35}$ |
| $G_{41}$ | $B_{42}$ | $G_{43}$ | $B_{44}$ | $G_{45}$ |
| $R_{51}$ | $G_{52}$ | $R_{53}$ | $G_{54}$ | $R_{55}$ |

PIXEL PROCESSING METHOD AND IMAGE PROCESSING SYSTEM THEREOF

BACKGROUND OF THE INVENTION

1. Field of the Invention

The present invention relates to a pixel processing method, and more particularly, to a pixel processing method and image processing system for reconstructing missing color components of each pixel.

2. Description of the Prior Art

Figure 1:
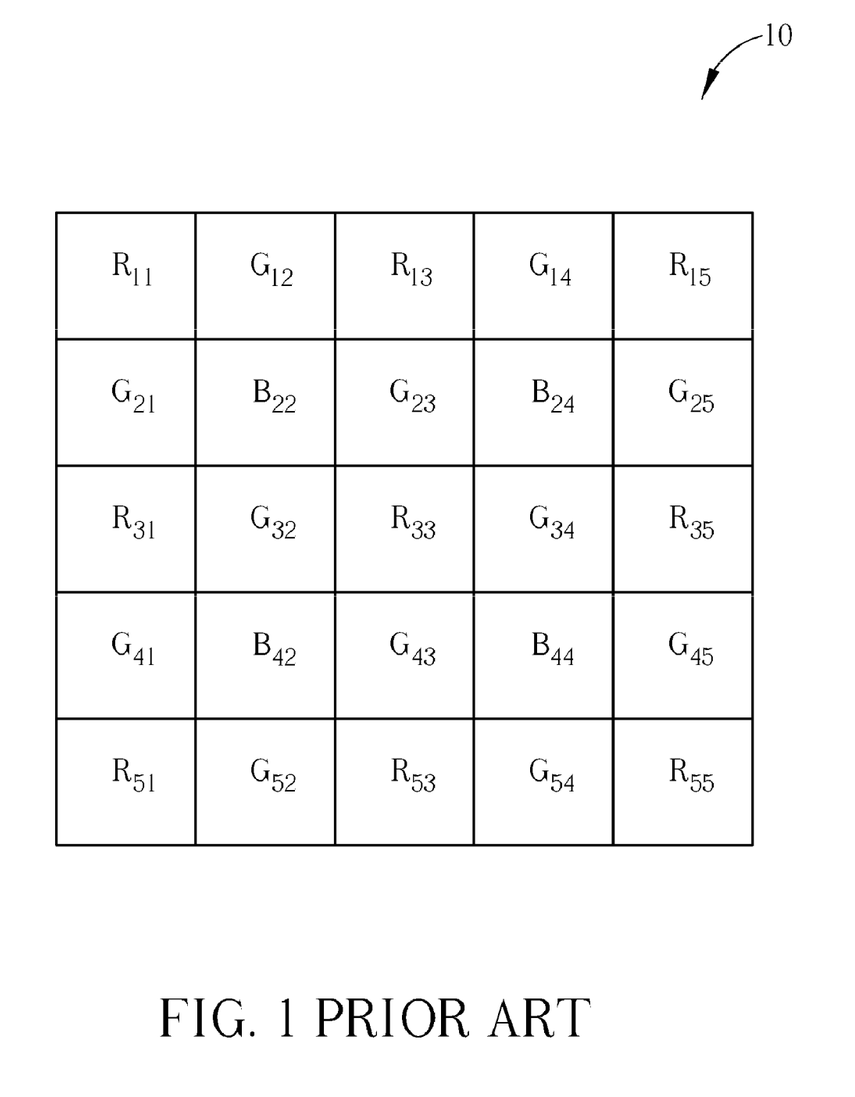
FIG. 1 is a diagram illustrating a color filter array generated by an image sensor of a conventional image processing system which senses an ambient image.

In a conventional image processing system, when an image is sensed by an image sensor, the image sensor will transmit the color component value of each pixel to a line buffer of an image signal processor (ISP), and save it in the line buffer temporarily, wherein each pixel comprises a color component value of a single color, as shown in FIG. 1. FIG. 1 is a diagram illustrating a color filter array 10 generated by an image sensor of a conventional image processing system which senses an ambient image. Each row of the color filter array 10 is composed by arranging different color component values of each pixel alternatively. Taking FIG. 1 as an example, the first row of the color filter array 10 saves the color component values of each pixel via arranging the red and the green colors (i.e., RG) alternatively, and then the second row saves the color component values of each pixel via arranging the green and the blue colors (i.e., GB) alternatively, and so on. However, each pixel is required to have the red, green and blue (i.e., RGB) color component values when a display displays an image; therefore, the color component value of each pixel in the color filter array 10 has to be processed for deriving the red, green and blue color component values of each pixel before being transmitted to a display driver of the display. Then, the display driver drives the display to show the image according to the red, green and blue color component values of each pixel.

Please refer to FIG. 1 again. If it is desired to compute the green color value $G_{33}$ of the pixel 33 (i.e., the pixel with the red color value $R_{33}$ shown in FIG. 1), the prior art design generates a horizontal difference dh and a vertical difference dv of the pixel 33 first, then compares the horizontal difference dh and the vertical difference dv for determining the color distribution of the pixel 33, and then selects an interpolation method used to interpolate the desired green color value $G_{33}$ according to the color distribution. Furthermore, the prior art design deduces the horizontal difference dh and the vertical difference dv by the color difference magnitude of the same color, that is, $dh=abs(R_{33}-R_{31})+abs(R_{33}-R_{35})+abs(G_{32}-G_{34})$ and $dv=abs(R_{33}-R_{13})+abs(R_{33}-R_{53})+abs(G_{23}-G_{43})$, wherein the $abs(R_{33}-R_{31})$ is an absolute value of the difference between $R_{33}$ and $R_{31}$. Because the prior art design deduces the horizontal difference dh and the vertical difference dv by the color difference magnitude of the same color, the prior art design fails to identify certain specific color distributions of the color filter array 10. For example, when $R_{13}=G_{23}=R_{33}=G_{43}=R_{53}=G_{34}$ and $R_{33}=R_{31}=R_{35}$, $G_{32}=G_{34}$, $R_{31} \neq G_{32}$ (e.g. a pattern with a plurality of vertical stripes separated by one pixel), the horizontal difference dh and the vertical difference dv will all be zero. Thus, the prior art design averages the $G_{23}$, $G_{34}$, $G_{43}$, $G_{32}$ disposed around the pixel 33 to generate the green color value $G_{33}$ of the pixel 33, and the computed green color value $G_{33}$ will deviate from the real value. The proper method is to interpolate the $G_{23}$ and $G_{43}$ positioned in the vertical direction to generate the green color value $G_{33}$ of the pixel 33. Therefore, how to effectively determine the surrounding color distribution of a pixel of a color filter array has become an urgent problem in the field of industry.

SUMMARY OF THE INVENTION

One of the objectives of the present invention is therefore to provide a pixel processing method and image processing system for reconstructing the missing color components of a pixel.

According to an exemplary embodiment of the present invention, a pixel processing method for handling a plurality of pixels corresponding to a color filter array to reconstruct missing color components of each pixel originally having a single color component is disclosed. The method includes: determining a first difference magnitude according to a difference between a predetermined color component value of a target pixel and a predetermined color component value of at least a surrounding pixel positioned in a first direction, wherein the predetermined color component value of the target pixel and the predetermined color component value of the surrounding pixel positioned in the first direction correspond to different color components, respectively; determining a second difference magnitude according to a difference between the predetermined color component value of the target pixel and a predetermined color component value of at least a surrounding pixel positioned in a second direction, wherein the predetermined color component value of the target pixel and the predetermined color component value of the surrounding pixel positioned in the second direction correspond to different color components, respectively, and an extension of the first direction crosses an extension of the second direction at the target pixel; generating a first determining value according to predetermined color component values of a plurality of pixels positioned in the first direction and the first difference magnitude; generating a second determining value according to predetermined color component values of a plurality of pixels positioned in the second direction and the second difference magnitude; and selecting predetermined color component values of a plurality of specific pixels to compute a target color component value according to a comparison result of the first and second determining values, and saving the target color component value.

According to another exemplary embodiment of the present invention, an image processing system is disclosed. The image processing system includes an image sensor and an image signal processor. The image sensor generates a color filter array having a plurality of pixels, wherein each pixel includes a single color component. The image signal processor is used for receiving a plurality of pixels, and reconstructs missing color components of each pixel by executing the following steps: determining a first difference magnitude according to a difference between a predetermined color component value of a target pixel and a predetermined color component value of at least a surrounding pixel positioned in a first direction, wherein the predetermined color component value of the target pixel and the predetermined color component value of the surrounding pixel positioned in the first direction correspond to different color components, respectively; determining a second difference magnitude according to a difference between the predetermined color component value of the target pixel and a predetermined color component value of at least a surrounding pixel positioned in a second direction, wherein the predetermined color component value of the target pixel and the predetermined color component value of the surrounding pixel positioned in the second direction correspond to different color components, respectively, and an extension of the first direction crosses an extension of the second direction at the target pixel; generating a first determining value according to predetermined color component values of a plurality of pixels positioned in the first direction and the first difference magnitude; generating a second determining value according to predetermined color component values of a plurality of pixels positioned in the second direction and the second difference magnitude; and selecting predetermined color component values of a plurality of specific pixels to compute a target color component value according to a comparison result of the first and second determining values, and saving the target color component value.

In accordance with the above exemplary embodiments, a better and more real target color component value can be derived.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2A:
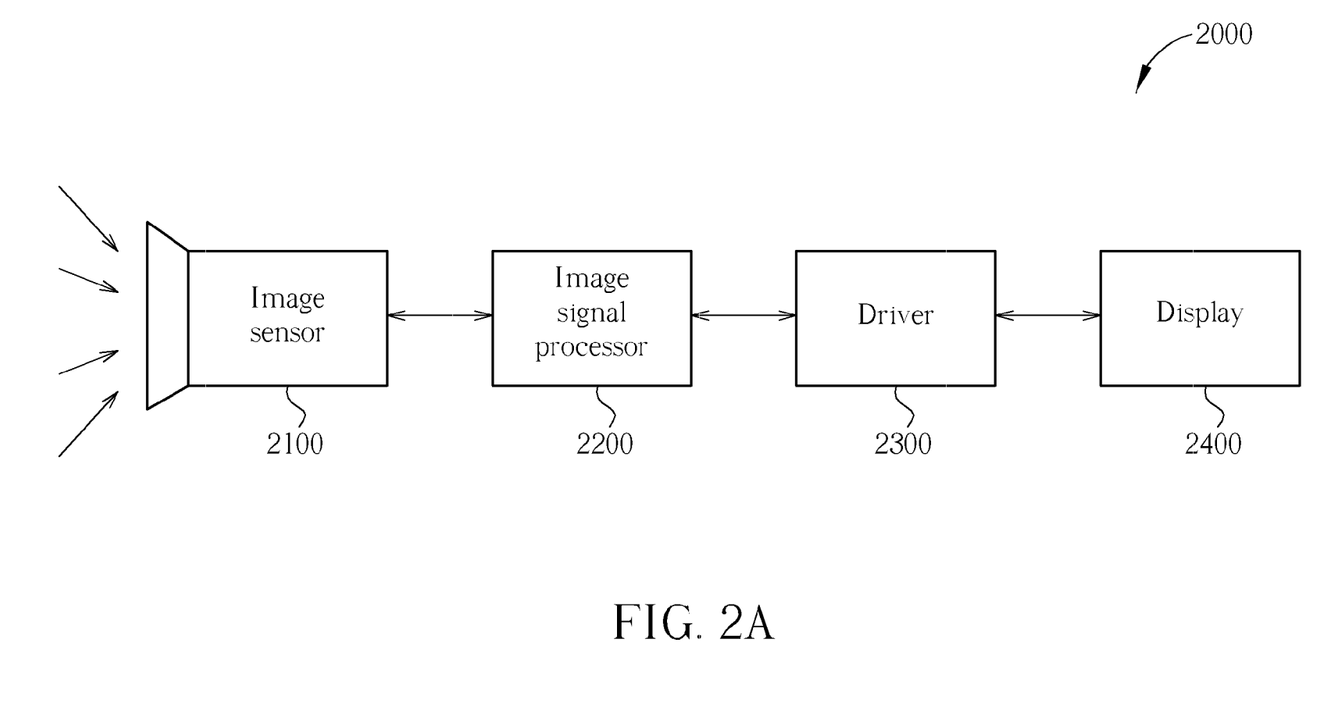
FIG. 2A is a block diagram illustrating an image processing system according to an exemplary embodiment of the present invention.

Please refer to FIG. 2A. FIG. 2A is a block diagram illustrating an image processing system according to an exemplary embodiment of the present invention. The image processing system 2000 includes an image sensor 2100, an image signal processor 2200, a driver 2300 and a display 2400. The image sensor 2100 can be a charge coupled device (CCD) or a complementary metal-oxide semiconductor (CMOS) image sensor, for forming the color filter array with a plurality of pixels according to the received light, wherein each pixel includes a single color component. The color filter array formed by the image sensor 2100 is similar to that shown in FIG. 1. The image sensor 2100 transmits the formed color filter array to the image signal processor 2200 row by row. The image signal processor 2200 therefore utilizes a plurality of line buffers (not shown in FIG. 2A) to buffer a plurality of rows of pixels, respectively. The image signal processor 2200 starts processing the buffered pixels after a particular data amount of the buffered pixels has been obtained; next, the image signal processor 2200 transmits the processed pixels to the following driver 2300. The driver 2300 combines the processed pixels, and displays them on the display 2400. Specifically, the pixel processing operation performed by the image signal processor 2200 will be detailed using the following exemplary embodiments and the accompanying FIGS. 2B, 3, 4 and 5.

Figure 2B:
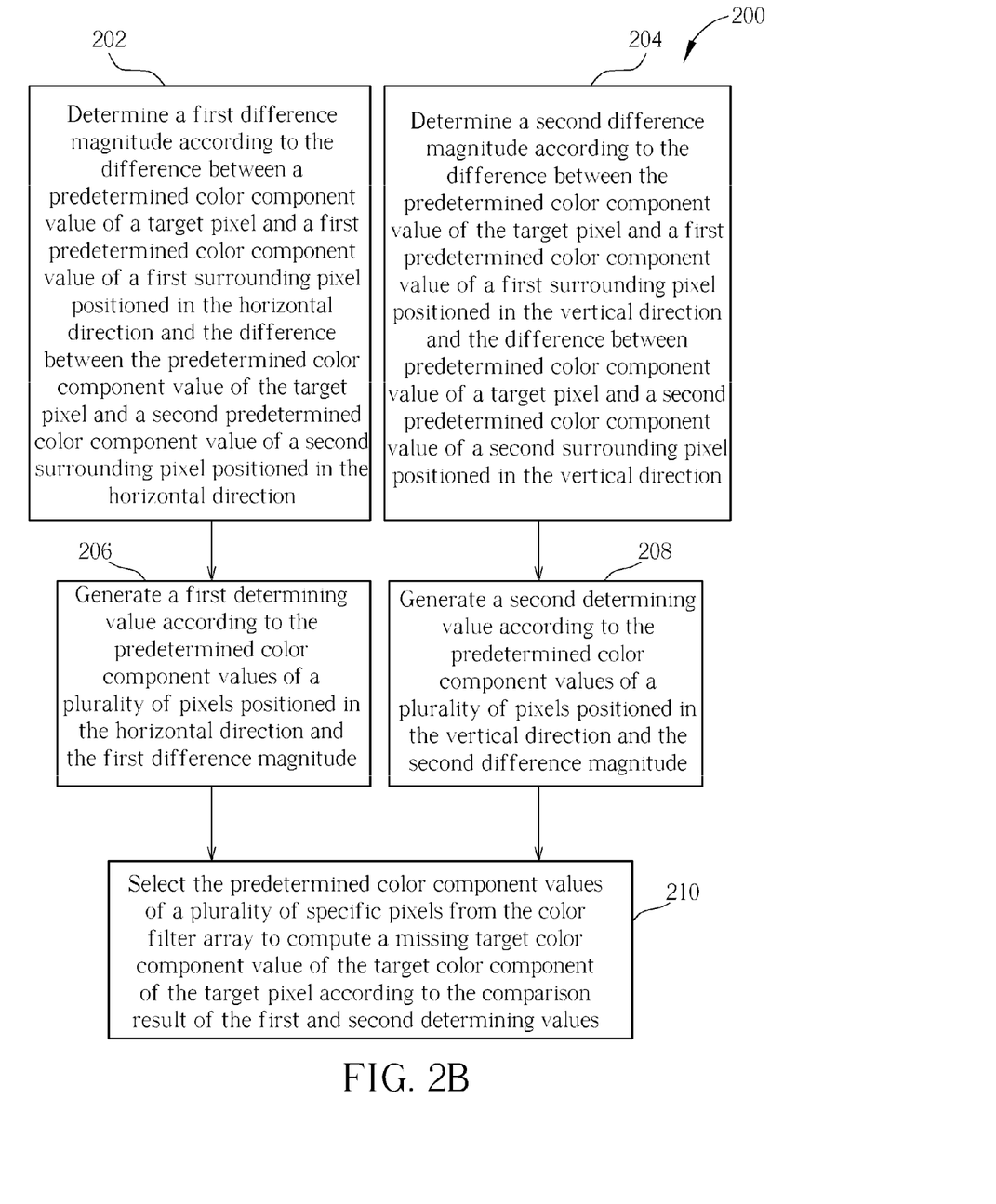
FIG. 2B is a flowchart illustrating a pixel processing method for handling a plurality of pixels corresponding to a color filter array to reconstruct missing color components of each pixel originally having a single color component according to an exemplary embodiment of the present invention.
Figure 3:
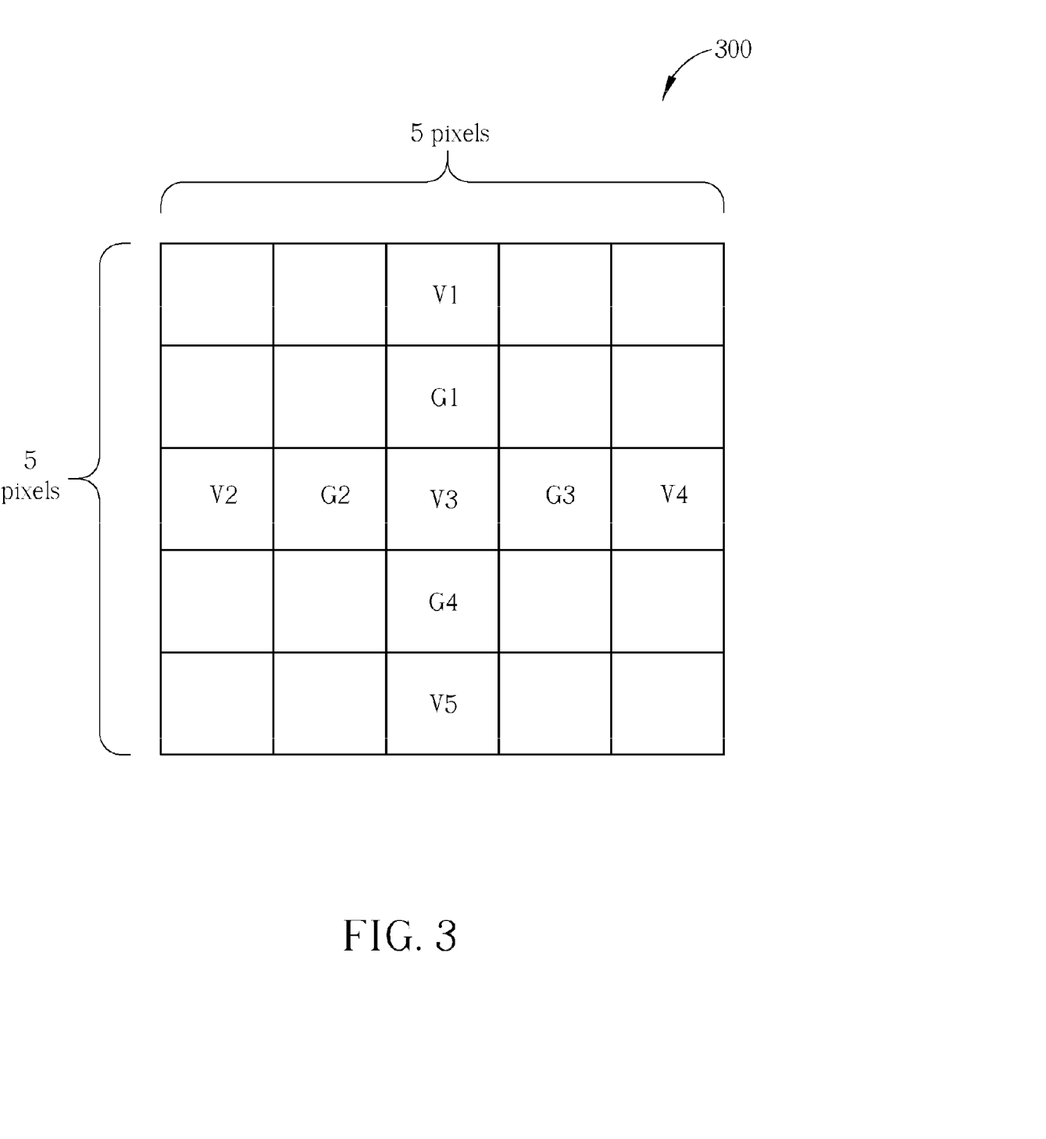
FIG. 3 is a diagram illustrating a color filter array of a 5-by-5 block of pixels according to the present invention.

Please refer to FIG. 2B. FIG. 2B is a flowchart illustrating a pixel processing method 200 for handling a plurality of pixels corresponding to a color filter array to thereby reconstruct the missing color components of each pixel originally having a single color component according to an exemplary embodiment of the present invention. Please note that the color filter array of the present invention utilizes a 5-by-5 block of pixels as an operation block, wherein a center pixel of the operation block is a target pixel V3 that the pixel processing method 200 of the present invention wants to process, and a predetermined color component of the target pixel V3 can be a blue (B) color component or a red (R) color component, as shown in FIG. 3. FIG. 3 is a diagram illustrating a color filter array 300 of the 5-by-5 block of pixels according to the present invention. Please note that the 5-by-5 block of pixels is not a limitation of the present invention. Those skilled in this art can easily implement a block of pixels having a different size (e.g., a 7-by-7 block of pixels) through some appropriate modifications upon the disclosed exemplary embodiments after reading the disclosure of the present invention. Because the pixel processing method 200 of the present invention does not need to utilize all of the pixels included in the color filter array 300 in the process of deriving a target color component value of a target color component of the target pixel V3, the color filter array 300 shown in FIG. 3 merely shows representative labels of the needed pixels, say, pixels (V2, G2, V3, G3, V4) in the third row and the pixels (V1, G1, V3, G4, V5) in the third row, whereas other pixels are shown using blank squares. Provided that substantially the same result is achieved, the steps of the flowchart shown in FIG. 2B need not be in the exact order shown and need not be contiguous; that is, other steps can be intermediate. The pixel processing method 200 comprises the following steps:

Step 202: Determine a first difference magnitude d1 according to the difference between a predetermined color component value $v_3$ of a target pixel V3 and a first predetermined color component value $g_2$ of a first surrounding pixel G2 positioned in the horizontal direction and the difference between the predetermined color component value $v_3$ of the target pixel V3 and a second predetermined color component value $g_3$ of a second surrounding pixel G3 positioned in the horizontal direction, wherein the predetermined color component value $v_3$ of the target pixel V3 and the predetermined color component values $g_2$, $g_3$ of the first and second surrounding pixels G2, G3 correspond to different color components, respectively.

Step 204: Determine a second difference magnitude d2 according to the difference between the predetermined color component value $v_3$ of the target pixel V3 and a first predetermined color component value $g_1$ of a first surrounding pixel G1 positioned in the vertical direction and the difference between predetermined color component value $v_3$ of a target pixel V3 and a second predetermined color component value $g_4$ of a second surrounding pixel G4 positioned in the vertical direction, wherein the predetermined color component value $v_3$ of the target pixel V3 and the predetermined color component values $g_1$, $g_4$ of the first and second surrounding pixels G1, G4 correspond to different color components, respectively.

Step 206: Generate a first determining value dh according to the predetermined color component values $v_2, g_2, v_3, g_3, v_4$ of a plurality of pixels V2, G2, V3, G3, V4 positioned in the horizontal direction and the first difference magnitude d1.

Step 208: Generate a second determining value dv according to the predetermined color component values $v_1, g_1, v_3, g_4, v_5$ of a plurality of pixels V1, G1, V3, G4, V5 positioned in the vertical direction and the second difference magnitude d2.

Step 210: Select the predetermined color component values of a plurality of specific pixels from the color filter array 300 to compute a missing target color component value of the target color component of the target pixel V3 according to the comparison result of the first and second determining values dh, dv, and then save the target color component value.

Please note that, the pixel processing method 200 of the present invention is not limited to handling the pixels (V2, G2, V3, G3, V4) in the third row positioned in the horizontal direction and the pixels (V1, G1, V3, G4, V5) in the third column positioned in the vertical direction. With some appropriate modifications made to the disclosed exemplary embodiments without departing from the spirit of the present invention, the pixel processing method 200 of the present invention can also handle any number of pixels that are positioned along directions orthogonal to each other. These alternative designs all fall within the scope of the present invention.

The first surrounding pixel G2, the second surrounding pixel G3, the first surrounding pixel G1 and the second surrounding pixel G4 are all disposed adjacent to the target pixel V3. Furthermore, the predetermined color component of the target pixel V3 and the color components of the pixels V1, V2, V4, V5 are the same according to an exemplary embodiment of the present invention. In other words, the color components of the pixels V1, V2, V4, V5 will be blue when the predetermined color component of the target pixel V3 is the blue color component; similarly, the color components of the pixels V1, V2, V4, V5 will be red when the predetermined color component of the target pixel V3 is the red color component. The color components of the first surrounding pixel G2, the second surrounding pixel G3, the first surrounding pixel G1 and the second surrounding pixel G4 are all green. In short, the objective of the pixel processing method 200 of the present invention is to compute a green color component value of the green color component of the target pixel V3, and then save the green color component value of the target pixel V3.

In step 202, the first predetermined color component value $g_2$ of the first surrounding pixel G2 and the second predetermined color component value $g_3$ of the second surrounding pixel G3 in the horizontal direction will be retrieved for respectively computing a first difference value $(g_2-v_3)$ between the first predetermined color component value $g_2$ and the predetermined color component value $v_3$ of the target pixel V3 and a second difference value $(g_3-v_3)$ of the first predetermined color component value $g_3$ and the predetermined color component value $v_3$ of the target pixel V3, wherein the first surrounding pixel G2 and the second surrounding pixel G3 are disposed immediately adjacent to the target pixel V3. Subsequently, a sum value is derived by summing up the first difference value $(g_2-v_3)$ and the second difference value $(g_3-v_3)$, and an absolute value which serves as the first difference magnitude d1 is derived according to the sum value and an adjustment factor.

Please note that the order of utilizing the calculated sum value and the adjustment factor to generate the first difference magnitude d1 is not limited in the present invention. In other words, the calculated sum value can be first divided by the adjustment factor to generate an adjusted sum value, and then the first difference magnitude d1 is derived by performing an absolute value operation on the adjusted sum; or an absolute value operation is first performed on the calculated sum value to generate an operation result, and the operation result is further divided by the adjustment factor to generate the first difference magnitude d1. These embodiments should be included within the scope of the present invention. In addition, the adjustment factor of the present invention is set by $1/2^N$, where N is a positive integer. The first difference magnitude d1 can be expressed by the following equation (1) where N=2 in this embodiment:

$$d1 = \text{abs}(((g_2 - v_3) + (g_3 - v_3))/(2^2)) \quad (1)$$
$$= \text{abs}((g_2 + g_3 - 2*v_3)/(2^2))$$

Similarly, in step 204, the first predetermined color component value $g_1$ of the first surrounding pixel G1 and the second predetermined color component value $g_4$ of the second surrounding pixel G4 in the vertical direction will be retrieved for respectively computing a first difference value $(g_1-v_3)$ between the first predetermined color component value $g_1$ and the predetermined color component value $v_3$ of the target pixel V3 and a second difference value $(g_4-v_3)$ between the first predetermined color component value $g_4$ and the predetermined color component value $v_3$ of the target pixel V3, wherein the first surrounding pixel G1 and the second surrounding pixel G4 are disposed immediately adjacent to the target pixel V3. Subsequently, the first difference value $(g_1-v_3)$ and the second difference value $(g_4-v_3)$ are summed up to generate a sum value, and calculate an absolute value which serves as the second difference magnitude d2 is derived according to the calculated sum value and an adjustment factor.

Similarly, the order of utilizing the calculated sum value and the adjustment factor to generate the second difference magnitude d2 is not limited in the present invention. In other words, the calculated sum value can be first divided by the adjustment factor to generate an adjusted sum value, and the second difference magnitude d2 is derived from performing an absolute value operation on the adjusted sum value; or an absolute value operation is performed on the calculated sum value to generate an operation result, and the operation result is further divided by the adjustment factor to generate the second difference magnitude d2. These embodiments should be included within the scope of the present invention. In addition, the adjustment factor of the present invention is set by $1/2^N$, where N is a positive integer. The second difference magnitude d2 can be expressed by the following equation (2) where N=2 in this embodiment:

$$d2 = \text{abs}(((g_1 - v_3) + (g_4 - v_3))/(2^2)) \quad (2)$$
$$= \text{abs}((g_1 + g_4 - 2*v_3)/(2^2))$$

Subsequently, taking target pixel V3 as a center point, the step 206 of the present invention is used for computing a horizontal difference. Moreover, the pixel processing method 200 of the present invention generates the first determining value dh according the predetermined color component values $v_2$, $g_2$, $v_3$, $g_3$, $v_4$ of a plurality of pixels V2, G2, V3, G3, V4 positioned in the horizontal direction and the first difference magnitude d1. In this embodiment, the first determining value dh can be expressed by the following equation (3):

$$dh = \text{abs}(v_3-v_2) + \text{abs}(v_3-v_4) + \text{abs}(g_2-g_3) + \text{abs}((g_2+g_3-2*v3)/(2^2)) \quad (3)$$

In the above equation (3), $\text{abs}(v_3-v_2)$ is the difference magnitude between the predetermined color component value of the target pixel V3 and the predetermined color component value of the pixel V2, $\text{abs}(v_3-v_4)$ is the difference magnitude between the predetermined color component value of the target pixel V3 and the predetermined color component value of the pixel V4, and the $\text{abs}(g_2-g_3)$ is the difference magnitude between the predetermined color component value of the target pixel G2 and the predetermined color component value of the pixel G3.

Taking target pixel V3 as a center point, the step 208 of the present invention is used for computing a vertical difference. Specifically, the pixel processing method 200 of the present invention generates the second determining value dv according the predetermined color component values $v_1$, $g_1$, $v_3$, $g_4$, $v_5$ of a plurality of pixels V1, G1, V3, G4, V5 positioned in the vertical direction and the second difference magnitude d2. In this embodiment, the second determining value dv can be expressed by the following equation (4):

$$dv = \text{abs}(v_3-v_1) + \text{abs}(v_3-v_5) + \text{abs}(g_1-g_4) + \text{abs}((g_1+g_4-2*v_3)/(2^2)) \quad (4)$$

In the above equation (4), $\text{abs}(v_3-v_1)$ is the difference magnitude between the predetermined color component value of the target pixel V3 and the predetermined color component value of the pixel V1, $\text{abs}(v_3-v_5)$ is the difference magnitude between the predetermined color component value of the target pixel V3 and the predetermined color component value of the pixel V5, and $\text{abs}(g_1-g_4)$ is the difference magnitude between the predetermined color component value of the target pixel G1 and the predetermined color component value of the pixel G4.

In step 210, a comparison result is derived from comparing the first and second determining values dh, dv when the first and second determining values dh, dv are obtained. Subsequently, predetermined color component values of a plurality of specific pixels of the color filter array 300 are selected according to the comparison result for computing a missing target color component value $g_{33}$ of the target color component of the target pixel V3, and then the target color component value $g_{33}$ is saved.

Moreover, if the horizontal difference is smaller than the vertical difference (i.e. dh<dv), the target color component value $g_{33}$ can be derived by the following equation (5):

$$g_{33} = ((g_2+g_3)/2) + ((2*v_3-v_2-v_4)/4) \quad (5)$$

If the vertical difference is smaller than the horizontal difference (i.e. dh>dv), the target color component value $g_{33}$ can be derived by the following equation (6):

$$g_{33} = ((g_1+g_4)/2) + ((2*v_3-v_1-v_5)/4) \quad (6)$$

If the vertical difference is equal to the horizontal difference (i.e. dh=dv), the target color component value $g_{33}$ can be derived by the following equation (7):

$$g_{33} = ((g_1+g_2+g_3+g_4)/4) + ((4*v_3-v_1-v_2-v_4-v_5)/16) \quad (7)$$

Thus, the missing target color component value $g_{33}$ of the target color component of the target pixel V3 can be derived by one of the equations (5), (6) and (7) mentioned above.

Figure 4:
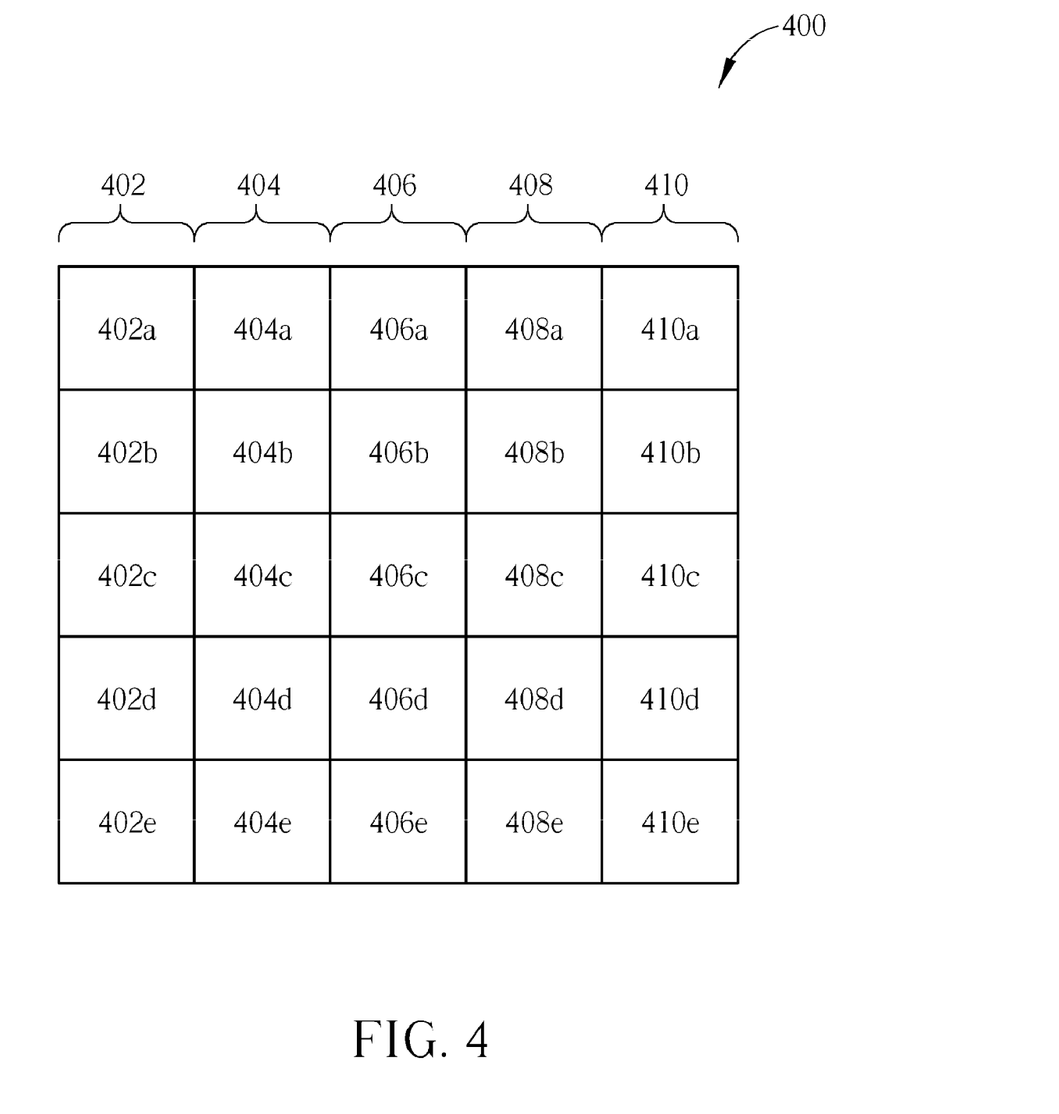
FIG. 4 is a diagram illustrating a color filter array of a first specific image.
Figure 5:
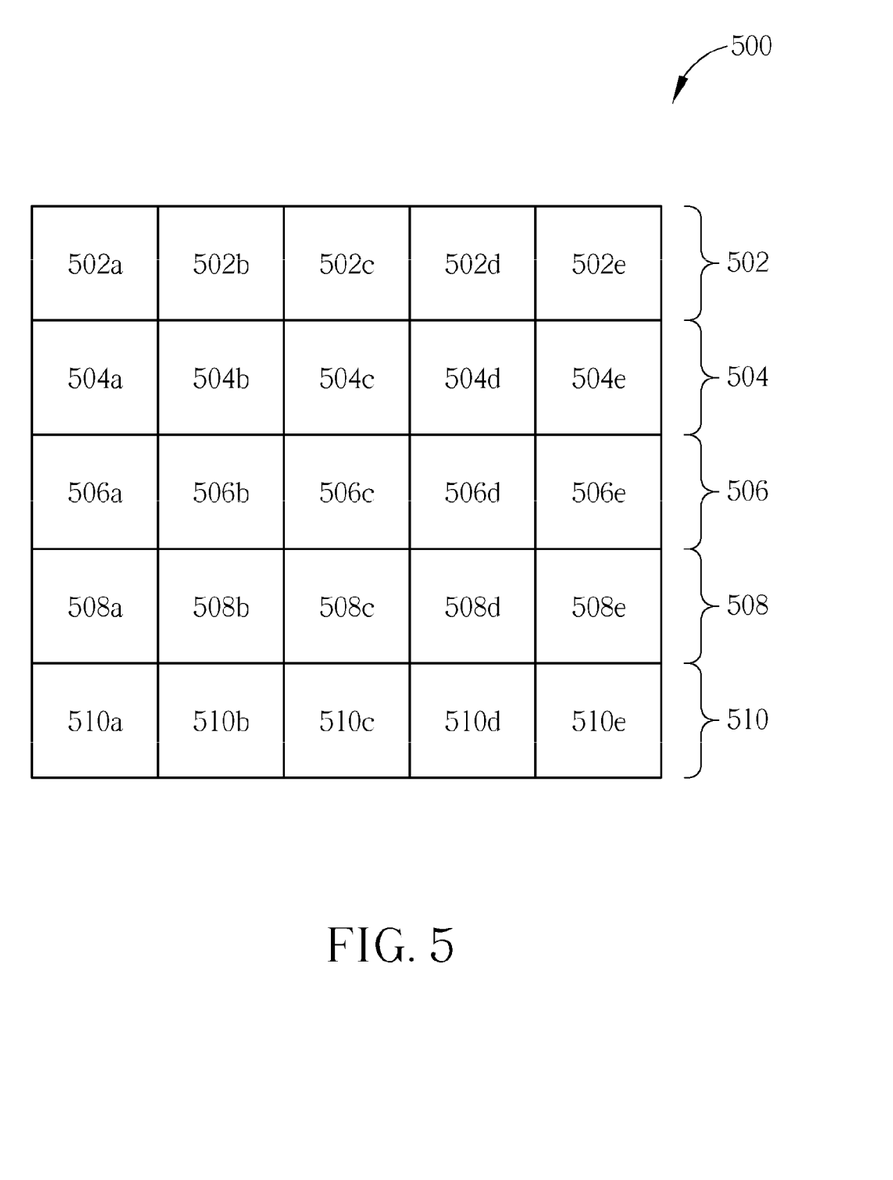
FIG. 5 is a diagram illustrating a color filter array of a second specific image.

Please refer to FIG. 4 and FIG. 5. FIG. 4 is a diagram illustrating a color filter array 400 of a first specific image. FIG. 5 is a diagram illustrating a color filter array 500 of a second specific image. The color filter array 400 comprises a first column 402, a second column 404, a third column 406, a fourth column 408 and a fifth column 410, wherein the first column 402 includes a plurality of pixels 402a, 402b, 402c, 402d, 402e, the second column 404 includes a plurality of pixels 404a, 404b, 404c, 404d, 404e, the third column 406 includes a plurality of pixels 406a, 406b, 406c, 406d, 406e, the fourth column 408 includes a plurality of pixels 408a, 408b, 408c, 408d, 408e, and the fifth column 410 includes a plurality of pixels 410a, 410b, 410c, 410d, 410e. Furthermore, pixels in the first column 402, the third column 406 and the fifth column 410 have the same predetermined color component values, and pixels in the second column 404 and the fourth column 408 also have the same predetermined color component values; additionally, the predetermined color component values of the first column 402 are different with the predetermined color component values of the second column 404. Therefore, the color filter array 400 shows a pattern with vertical stripes h separated by one pixel. Please refer to the color filter array 400 shown in FIG. 4 in conjunction with the color filter array 300 shown in FIG. 3. Suppose that the predetermined color component values $v_1$, $g_1$, $v_3$, $g_4$, $v_5$ of pixels V1, G1, V3, G4, V5 in the color filter array 300 serve as the predetermined color component values of pixels 406a, 406b, 406c, 406d, 406e located at the corresponding positions in the color filter array 400, respectively, and the predetermined color component values $v_2$, $g_2$, $v_3$, $g_3$, $v_4$ of pixels V2, G2, V3, G3, V4 in the color filter array 300 serve as the predetermined color component values of pixels 402c, 404c, 406c, 408c, 410c located at the corresponding positions in the color filter array 400, respectively. Therefore, the first determining value dh will not be zero and the second determining value dv will be zero when the first determining value dh and the second determining value dv of the pixel 406c (i.e., the target pixel) are derived using the equations (3) and (4) of the present invention. Thus, it can be determined that the vertical difference of the pixel 406c (i.e., the target pixel) of the color filter array 400 is smaller (i.e., dh>dv); therefore, the target color component value of the pixel 406c can be computed by equation (6). Please note that, the target color component value is a green color component value of the green color component.

It should be noted that, compared with the pixel processing method 200 of the present invention, the first determining value dh and the second determining value dv will all be zero if they are computed using the prior art image processing method. As a result, the prior art image processing method will utilize the equation (7) for computing the target color component value of the pixel 406c, which will derive a worse and unreal target color component value.

Similarly, the color filter array 500 comprises a first row 502, a second row 504, a third row 506, a fourth row 508 and a fifth row 510, wherein the first row 502 includes a plurality of pixels 502a, 502b, 502c, 502d, 502e, the second row 504 includes a plurality of pixels 504a, 504b, 504c, 504d, 504e, the third row 506 includes a plurality of pixels 506a, 506b, 506c, 506d, 506e, the fourth row 508 includes a plurality of pixels 508a, 508b, 508c, 508d, 508e, and the fifth row 510 includes a plurality of pixels 510a, 510b, 510c, 510d, 510e. Furthermore, pixels in the first row 502, the third row 506 and the fifth row 510 have the same predetermined color component values, and pixels in the second row 504 and the fourth row 508 also have the same predetermined color component values; additionally, the predetermined color component values of the first row 502 are different from the predetermined color component values of the second row 504. Therefore, the color filter array 500 shows a pattern with horizontal stripes separated by one pixel. In addition, please refer to the color filter array 500 shown in FIG. 5 in conjunction with the color filter array 300 shown in FIG. 3. Assume that the predetermined color component values $v_2$, $g_2$, $v_3$, $g_3$, $v_4$ of pixels V2, G2, V3, G3, V4 in the color filter array 300 serve as the predetermined color component values of pixels 506a, 506b, 506c, 506d, 506e located at the corresponding positions in the color filter array 500, respectively, and the predetermined color component values $v_1$, $g_1$, $v_3$, $g_4$, $v_5$ of pixels V1, G1, V3, G4, V5 in the color filter array 300 serve as the predetermined color component values of pixels 502c, 504c, 506c, 508c, 510c located at the corresponding positions in the color filter array 500, respectively. Therefore, the first determining value dh will be zero and the second determining value dv will not be zero when the first determining value dh and the second determining value dv of the pixel 506c (i.e., the target pixel) are computed using the equations (3) and (4) of the present invention. Thus, it can be determined that the horizontal difference of the pixel 506c (i.e., target pixel) of the color filter array 500 is smaller (i.e. dh<dv); therefore, the target color component value of the pixel 506c can be computed by equation (5). Similarly, compared with the pixel processing method 200 of the present invention, the first determining value dh and the second determining value dv will all be zero if they are computed by the prior art image processing method. As a result, the prior art image processing method will utilize the equation (7) for computing the target color component value of the pixel 506c, which will derive a worse and unreal target color component value.

Please note that, the pixel processing method 200 of the present invention is not limited to be practiced by any kinds of means. In other words, any steps of the pixel processing method 200 can be practiced by hardware means, firmware means, software means or the combination of the afore-mentioned means, and these alternative designs all fall within the scope of the present invention.

In summary, the conception of the present invention has two main points: first, using a difference value between a predetermined color component value of a target pixel and a predetermined color component of a surrounding pixel positioned in a horizontal direction to serve as one of the factors associated with determining a horizontal difference of the target pixel; second, using a difference value between the predetermined color component value of the target pixel and a predetermined color component of a surrounding pixel positioned in a vertical direction to serve as one of the factors associated with determining a vertical difference of the target pixel, wherein the predetermined color component value of the target pixel and the predetermined color component of the surrounding pixel correspond to different color components.

Those skilled in the art will readily observe that numerous modifications and alterations of the device and method may be made while retaining the teachings of the invention.

What is claimed is:

1. A pixel processing method for handling a plurality of pixels corresponding to a color filter array to reconstruct missing color components of each pixel originally having a single color component, the method comprising:

determining a first difference magnitude according to a difference between a predetermined color component value of a target pixel and a predetermined color component value of at least a surrounding pixel positioned in a first direction, wherein the predetermined color component value of the target pixel and the predetermined color component value of the surrounding pixel positioned in the first direction correspond to different color components, respectively;

determining a second difference magnitude according to a difference between the predetermined color component value of the target pixel and a predetermined color component value of at least a surrounding pixel positioned in a second direction, wherein the predetermined color component value of the target pixel and the predetermined color component value of the surrounding pixel positioned in the second direction correspond to different color components, respectively, and an extension of the first direction crosses an extension of the second direction at the target pixel;

generating a first determining value according to predetermined color component values of a plurality of pixels positioned in the first direction and the first difference magnitude;

generating a second determining value according to predetermined color component values of a plurality of pixels positioned in the second direction and the second difference magnitude; and selecting predetermined color component values of a plurality of specific pixels to compute a target color component value which is a missing component value of the target pixel according to a comparison result of the first and second determining values, and saving the target color component value.

2. The pixel processing method of claim 1, wherein the surrounding pixel positioned in the first direction and the surrounding pixel positioned in the second direction are both immediately adjacent to the target pixel.

3. The pixel processing method of claim 1, wherein the first direction is orthogonal to the second direction.

4. The pixel processing method of claim 3, wherein the first direction is a horizontal direction and the second direction is a vertical direction.

5. The pixel processing method of claim 4, wherein the step of determining the first difference magnitude comprises:

retrieving a first predetermined color component value of a first surrounding pixel positioned in the first direction and a second predetermined color component value of a second surrounding pixel positioned in the first direction, wherein the first surrounding pixel and the second surrounding pixel are both immediately adjacent to the target pixel;

computing a first difference value between the first predetermined color component value and the predetermined color component value of the target pixel;

computing a second difference value between the second predetermined color component value and the predetermined color component value of the target pixel; and determining the first difference magnitude according to the first difference value and the second difference value.

6. The pixel processing method of claim 5, wherein the step of determining the first difference magnitude according to the first difference value and the second difference value comprises:

summing up the first difference value and the second difference value to generate a sum value; and calculating an absolute value which serves as the first difference magnitude according to the sum value and an adjustment factor.

7. The pixel processing method of claim 6, wherein the step of calculating the absolute value which serves as the first difference magnitude according to the sum value and the adjustment factor comprises:
dividing the sum value by the adjustment factor to generate an adjusted sum value, and then performing an absolute value operation on the adjusted sum value to generate the first difference magnitude; or
performing an absolute value operation on the sum value to generate an operation result, and then dividing the operation result by the adjustment factor to generate the first difference magnitude;
wherein the adjustment factor is equal to $\frac{1}{2}^N$, and N is a positive integer.

8. The pixel processing method of claim 4, wherein the step of determining the second difference magnitude comprises:
retrieving a first predetermined color component value of a first surrounding pixel positioned in the second direction and a second predetermined color component value of a second surrounding pixel positioned in the second direction, wherein the first surrounding pixel and the second surrounding pixel are both immediately adjacent to the target pixel;
computing a first difference value between the first predetermined color component value and the predetermined color component value of the target pixel;
computing a second difference value between the second predetermined color component value and the predetermined color component value of the target pixel; and
determining the second difference magnitude according to the first difference value and the second difference value.

9. The pixel processing method of claim 8, wherein the step of determining the second difference magnitude according to the first difference value and the second difference value comprises:
summing up the first difference value and the second difference value to generate a sum value; and
calculating an absolute value which serves as the second difference magnitude according to the sum value and an adjustment factor.

10. The pixel processing method of claim 9, wherein the step of calculating the absolute value which serves as the second difference magnitude according to the calculated sum and the adjustment factor comprises:
dividing the sum value by the adjustment factor to generate an adjusted sum value, and then performing an absolute value operation on the adjusted sum value to generate the second difference magnitude; or
performing an absolute value operation on the sum value to generate an operation result, and then dividing the operation result by the adjustment factor to generate the second difference magnitude;
wherein the adjustment factor is equal to $\frac{1}{2}^N$, and N is a positive integer.

11. The pixel processing method of claim 1, wherein the target color component value, the predetermined color component value of the first pixel and the predetermined color component value of the second pixel are color component values of a green (G) color.

12. The pixel processing method of claim 1, wherein the predetermined color component value of the target pixel is a color component value of a red (R) color or a color component value of a blue (B) color.

13. An image processing system, comprising:
an image sensor, for generating a color filter array having a plurality of pixels, wherein each pixel includes a single color component; and
an image signal processor, for receiving the plurality of pixels, and reconstructing missing color components of each pixel by executing the following steps:
determining a first difference magnitude according to a difference between a predetermined color component value of a target pixel and a predetermined color component value of at least a surrounding pixel positioned in a first direction, wherein the predetermined color component value of the target pixel and the predetermined color component value of the surrounding pixel positioned in the first direction correspond to different color components, respectively;
determining a second difference magnitude according to a difference between the predetermined color component value of the target pixel and a predetermined color component value of at least a surrounding pixel positioned in a second direction, wherein the predetermined color component value of the target pixel and the predetermined color component value of the surrounding pixel positioned in the second direction correspond to different color components, respectively, and an extension of the first direction crosses an extension of the second direction at the target pixel;
generating a first determining value according to predetermined color component values of a plurality of pixels positioned in the first direction and the first difference magnitude;
generating a second determining value according to predetermined color component values of a plurality of pixels positioned in the second direction and the second difference magnitude; and
selecting predetermined color component values of a plurality of specific pixels to compute a target color component value according to a comparison result of the first and second determining values, and saving the target color component value.

14. The image processing system of claim 13, wherein the surrounding pixel positioned in the first direction and the surrounding pixel positioned in the second direction are both immediately adjacent to the target pixel.

15. The image processing system of claim 13, wherein the first direction is a horizontal direction and the second direction is a vertical direction.

16. The image processing system of claim 15, wherein the step of determining the first difference magnitude that is executed by the image signal processor comprises:
retrieving a first predetermined color component value of a first surrounding pixel positioned in the first direction and a second predetermined color component value of a second surrounding pixel positioned in the first direction, wherein the first surrounding pixel and the second surrounding pixel are both immediately adjacent to the target pixel;
computing a first difference value of the first predetermined color component value and the predetermined color component value of the target pixel;
computing a second difference value of the second predetermined color component value and the predetermined color component value of the target pixel; and
determining the first difference magnitude according to the first difference value and the second difference value.

17. The image processing system of claim 16, wherein the step of determining the first difference magnitude according to the first difference value and the second difference value that is executed by the image signal processor comprises:

summing up the first difference value and the second difference value to generate a sum value; and calculating an absolute value which serves as the first difference magnitude according to the sum value and an adjustment factor.

18. The image processing system of claim 15, wherein the step of determining the second difference magnitude that is executed by the image signal processor comprises:

retrieving a first predetermined color component value of a first surrounding pixel positioned in the second direction and a second predetermined color component value of a second surrounding pixel positioned in the second direction, wherein the first surrounding pixel and the second surrounding pixel are both immediately adjacent to the target pixel;

computing a first difference value between the first predetermined color component value and the predetermined color component value of the target pixel;

computing a second difference value between the second predetermined color component value and the predetermined color component value of the target pixel; and determining the second difference magnitude according to the first difference value and the second difference value.

19. The image processing system of claim 18, wherein the step of determining the second difference magnitude according to the first difference value and the second difference value that is executed by the image signal processor comprises:

summing up the first difference value and the second difference value to generate a sum value; and calculating an absolute value which serve as the second difference magnitude according to the sum value and an adjustment factor.

20. The image processing system of claim 13, wherein the target color component value, the predetermined color component value of the first pixel and the predetermined color component value of the second pixel are color component values of a green (G) color.

21. The image processing system of claim 13, wherein the predetermined color component value of the target pixel is a color component value of a red (R) color or a color component value of a blue (B) color.

* * * * *